G. W. KIRKPATRICK.
DIRECTION INDICATOR FOR AUTOMOBILES.
APPLICATION FILED SEPT. 18, 1916.
1,291,022.
Patented Jan. 14, 1919.
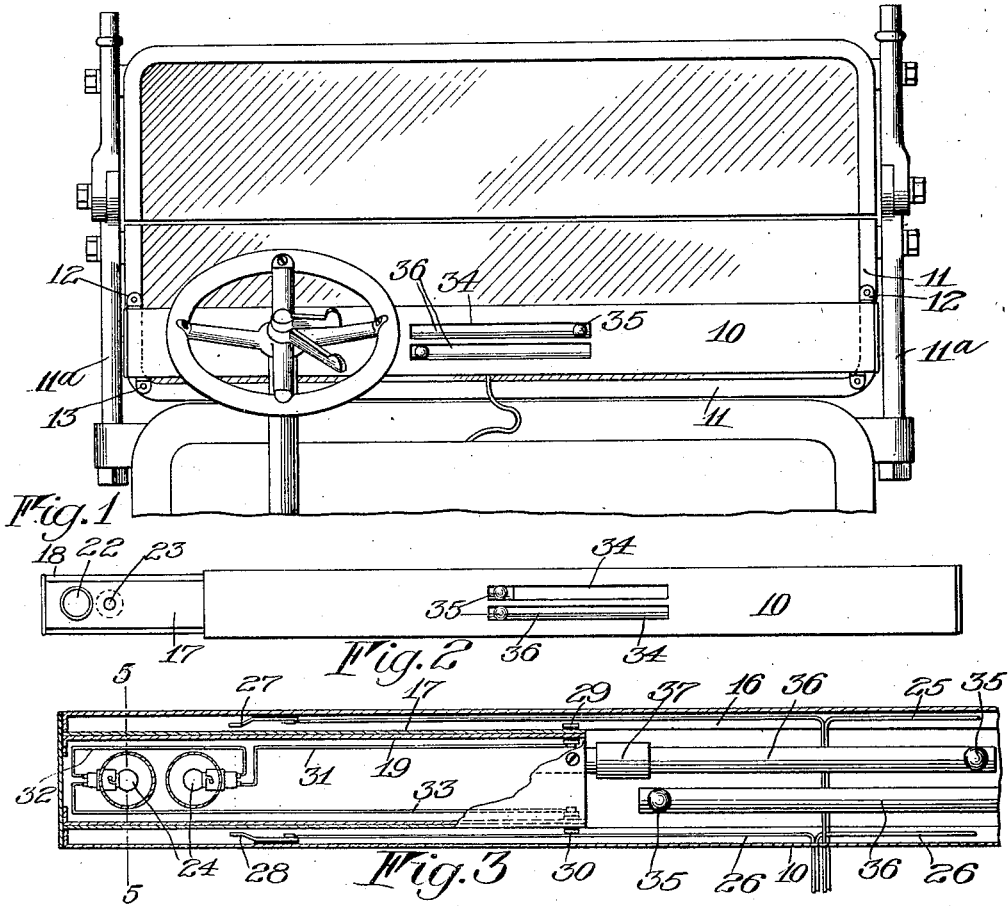
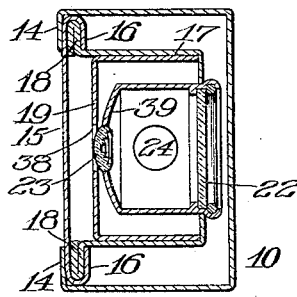
INVENTOR
George W. Kirkpatrick
BY
his ATTORNEYS

UNITED STATES PATENT OFFICE.

GEORGE W. KIRKPATRICK, OF ROCHESTER, NEW YORK.

DIRECTION-INDICATOR FOR AUTOMOBILES.

1,291,022.  Specification of Letters Patent.  Patented Jan. 14, 1919.

Application filed September 18, 1916. Serial No. 120,645.

*To all whom it may concern:*

Be it known that I, GEORGE W. KIRKPATRICK, of Rochester, in the county of Monroe and State of New York, have invented certain new and useful Improvements in Direction-Indicators for Automobiles; and I do hereby declare the following to be a full, clear, and exact description of the same, reference being had to the accompanying drawings, forming a part of this specification, and to the reference characters marked thereon.

My invention relates to a direction indicator for automobiles and other vehicles and has for its object to provide a device by which an occupant of a car may indicate the direction he intends to turn or the fact that he desires to bring the car to a standstill. A further object of the invention is to provide a signal carrying member movable to a position at which the signals will be visible from opposite directions to signal persons approaching from the front or rear of the machine. A still further object of the invention is to provide relatively large and small adjacently mounted signals movable to a point beyond the side of the car to become visible to persons at the front or in the rear of the machine which may be illuminated at night to form a distinctive signal adapted to avoid confustion as to the purpose for which the signals are displayed. Still another object of the invention is the display of adjacently mounted illuminated signals each visible from opposite directions and having relatively large and small areas of illumination for displaying light with the larger area of one signal visible from a different direction from that of the larger area of the other signal. To these and other ends the invention consists in certain improvements and combinations of parts, all as will be hereinafter more fully described, the novel features being pointed out in the claims at the end of the specification.

In the drawings:

Figure 1 is a view in elevation of an automobile windshield to which the direction indicator is shown applied;

Fig. 2 is an elevational view of one embodiment of the invention showing the left-hand signal moved to exposed position;

Fig. 3 is an enlarged detail sectional elevation through one end of the signal casing showing the manner of mounting the signal within the casing;

Fig. 4 is a horizontal sectional view through one end of the casing indicating the relative positions of the front and rear lamps, and Fig. 5 is an enlarged detail sectional view taken on line 5—5 of Fig. 3.

Similar reference characters throughout the several views indicate the same parts.

My present invention embodies an indicating or signaling device adaptable for use upon automobiles and other vehicles and preferably comprises a signal housing or casing arranged to be applied to the frame of the windshield of a car, the casing having guideways upon which the signals are movable to indicating positions upon opposite sides of the machine. However, the signal container or casing is readily adaptable for use upon other parts of the car than that to which it is shown, as will be understood. The advantage of placing the signal upon the windshield and within the supporting uprights thereof is to permit the shield to freely swing upon its pivots when the signal is not in use. It will be understood that the signals are readily operable with the shield moved to relatively different angles with respect to the body of the car, or in other words, that it is not necessary to have the shield in a vertical position before attempting to operate the signals. As the signals will only be held in exposed or signaling position for a comparatively short time they will not interfere with the adjustment of the windshield whenever it is desired to shift the same upon its pivots to various angles. In carrying out my present invention I have provided a signal casing or housing 10, the opposite ends of which are preferably mounted upon the rim or frame 11 of a windshield pivoted upon uprights 11ª. The casing is secured by means of suitable brackets 12 connected with the frame by the machine screws 13 or in any other described manner. The casing is preferably rectangular in cross section and in the present instance, is formed by bending a sheet metal plate into channel form and providing inturned flanges 14 upon the inner faces of which a plate 15 is positioned which is bent over at its sides to form flanges as indicated at 16 for the purpose of providing upper and lower guideways for the channel shaped member 17 as clearly shown in Fig. 5. The channel 17 is also preferably formed of sheet metal having outwardly extending flanges 18 slidably mounted in the guideways formed by the plate 15 and flanges 16. Within the channel 17 is placed a U-shaped member 19, the sides of which engage the inner faces of the legs of the channel 17. The U-shaped member 19 and channel 17 form an arm adapted to inclose the inner and outer signal lamps 20 and 21 respectively. The lamps have their larger illuminated faces projecting in opposite directions to form the main front and rear signals, the front signal being placed nearer the center of the casing than the rear signal as it is necessary to project the latter farther from the side of the car than the former on account of the body of the car being of greater width at the back than in the front. Each of the lamps is provided with the relatively large and small translucent plates 22 and 23 respectively, the former being preferably colored green and the latter red, and each being illuminated by an electric light 24 positioned between said plates as shown in Fig. 5. Current is supplied to the lamps by means of the wires 25 and 26 which connect with the terminals or insulated spring contacts 27 and 28 upon the inner walls of the casing 10, as shown in Fig. 3.

When the lamp supporting arm or slide is moved out to signaling position these terminals are engaged by the contacts 29 and 30 at the inner end of the slide and the circuit is then completed through the lamps by means of the wires 31, 32 and 33. The casing 10 is provided with the spaced slots 34 through which project the handles 35 carried by the extensions or operating rods 36 connected with and offset with respect to the lamp supporting arms for moving the latter into and out of the casing to display the signals upon opposite sides of the car. The rods are slidably mounted in guides 37 secured within the casing. In order to make the signals visible from the rear of the car it is necessary to move them out a considerable distance beyond the windshield, owing to the greater width of the car body at the rear thereof. This requires a relatively long slide or arm which, when moved out to its extreme position, must still project a considerable distance within the casing to form a support for the outer or projected end of the arm. The length of the windshield is not sufficient to accommodate alined arms of the necessary length adapted to abut at the center of the casing and for this reason the arm operating members 36 are spaced apart side by side preferably one above the other so that they will pass or clear each other when moved in and out. This construction permits the location of the handles 35 at points upon the opposite side of the center of the windshield so that the handle farthest from the driver is movable toward the steering wheel, while the nearest handle is movable away from the wheel in moving the arms to signaling position.

An aperture 38 is cut in the vertical wall of the U-shaped member 19 at a point opposite the smaller illuminated surface 23 to permit the light to be seen therethrough. The lamps are provided with reflectors 39 for concentrating the rays of light upon the larger translucent member 22 as shown in Fig. 5. By positioning a relatively large and small illuminated surface upon each side of the movable signal arms a distinctive two-light signal is provided which will be less confusing to automobile drivers and pedestrians than the single lights now in use for other purposes. In the operation of the signals movement of either of the signaling aims to one side of the car will indicate to persons at the front and rear thereof the direction which the driver intends to take, while outward movement of both of the arms at the same time will indicate that the machine is to be brought to a standstill.

It will be understood that the sliding arms supporting the lamps may be considered as signals independently of the lamps and may be used without the latter if desired.

I claim as my invention:

1. A direction indicator for vehicles comprising a movable member and a pair of adjacently mounted illuminated signals carried by said movable member, each of the signals being visible from opposite directions and having relatively large and small areas of illumination for displaying light with the larger area of one signal made visible from a different direction from the larger area of the other signal.

2. A direction indicator for vehicles comprising a guideway, an arm slidably mounted upon the guideway to extend beyond the side of the vehicle and a pair of adjacently mounted illuminated signals carried by said arm, each of said signals being visible from opposite directions and having relatively large and small areas of illumination for displaying light with the larger area of one signal visible from a different direction from the larger area of the other signal.

3. A direction indicator for vehicles comprising a guideway, an arm slidably mounted upon the guideway adapted to be moved beyond the side of the vehicle and a pair of adjacently mounted signals carried by said movable arm, each of the signals being visible from opposite directions and having relatively large and small areas of different colors, the larger area of one signal being visible from a different direction from the larger area of the other signal.

4. In a direction indicator for vehicles, the combination of a housing extending laterally across the vehicle, movable members, one adapted to be projected from each end of the housing, a pair of adjacently mounted signals carried by each of said members, and an operating arm carried by each of said members, said operating arms adapted to overlie each other within the housing.

5. A vehicle signaling device comprising a casing, a signaling arm slidably mounted in the casing, means for sliding the arm to and from the casing, and inner and outer lamps carried by the arm, each provided with relatively large and small illuminated faces visible from opposite directions, the larger illuminated face of one lamp being positioned upon the opposite side of the arm from the larger face of the other lamp.

GEORGE W. KIRKPATRICK.

Witnesses:
 IDA A. ZIMMER,
 C. P. DOWNS.

Copies of this patent may be obtained for five cents each, by addressing the "Commissioner of Patents, Washington, D. C."